US012718717B2

(12) United States Patent
Chen et al.

(10) Patent No.: US 12,718,717 B2
(45) Date of Patent: *Aug. 25, 2026

(54) DISPLAY PANEL ADAPTED TO SPHERICAL DISPLAY DEVICE AND CONFIGURATION METHOD THEREOF

(71) Applicant: AUO Corporation, Hsinchu City (TW)

(72) Inventors: Yea-Ching Chen, Hsinchu City (TW); Chih-Kai Wang, Hsinchu City (TW); Yu-Chin Wu, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/042,216

(22) Filed: Jan. 31, 2025

(65) Prior Publication Data

US 2025/0174160 A1 May 29, 2025

Related U.S. Application Data

(63) Continuation of application No. 18/091,587, filed on Dec. 30, 2022, now Pat. No. 12,243,449.

(30) Foreign Application Priority Data

Apr. 21, 2022 (TW) ................................ 111115314

(51) Int. Cl.

| | |
|---|---|
| ***G09F 9/33*** | (2006.01) |
| ***G09F 9/30*** | (2006.01) |
| ***G09F 9/302*** | (2006.01) |

(52) U.S. Cl.

CPC ................ *G09F 9/33* (2013.01); *G09F 9/301* (2013.01); *G09F 9/3026* (2013.01)

(58) Field of Classification Search

CPC ........... G09F 9/301; G09F 9/3026; G09F 9/33

See application file for complete search history.

(56) References Cited

U.S. PATENT DOCUMENTS

| | | | | |
|---|---|---|---|---|
| 9,924,604 | B2 * | 3/2018 | Drabant | H05K 5/30 |
| 11,152,433 | B2 * | 10/2021 | Liu | G09F 9/302 |
| 11,425,826 | B2 * | 8/2022 | Brackley | G09F 9/3026 |
| 12,027,103 | B2 * | 7/2024 | Hirai | G09G 5/36 |

FOREIGN PATENT DOCUMENTS

| | | | |
|---|---|---|---|
| EP | 3594929 A1 * | 1/2020 | G09F 9/3026 |

* cited by examiner

*Primary Examiner* — Vinh T Lam

(74) *Attorney, Agent, or Firm* — Tim Tingkang Xia, Esq.; Troutman Pepper Locke LLP

(57) ABSTRACT

A display panel adapted to a spherical display device includes a substrate and a plurality of display configuration groups. The display configuration groups are arranged on the substrate along a first direction. Each of the display configuration groups corresponds to a display number and a display pitch. Each of the display configuration groups includes at least one display row arranged along the first direction. Each of the at least one display row of each of the display configuration groups is arranged along a second direction orthogonal to the first direction according to the corresponding display number and the corresponding display pitch. At least two of the display configuration groups include different quantities of the at least one display row from each other.

9 Claims, 9 Drawing Sheets

S110

DISPLAY PANEL ADAPTED TO SPHERICAL DISPLAY DEVICE AND CONFIGURATION METHOD THEREOF

CROSS-REFERENCE TO RELATED PATENT APPLICATION

This application is a continuation application of U.S. patent application Ser. No. 18/091,587, filed on Dec. 30, 2022, which itself claims priority to and the benefit of, pursuant to 35 U.S.C. § 119(a), patent application Ser. No. 111115314 filed in Taiwan on Apr. 21, 2022. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a light box structure, and particularly to a light box structure having an arc shape.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The display screen being used in flight simulation is typically a one-dimensional curved projecting screen, or is spliced by a plurality of display screens or projecting screens. However, the splicing location thereof may have an edge frame, thus causing an ill visual effect. In addition, only the horizontal view thereof is large, and the vertical view is lacking, thus resulting in insufficient envelopment and presence. In view of this, in recent years, a spherical display device formed by splicing a plurality of display panels has been developed, thus enhancing the envelopment and presence of the pilot in performing flight simulation.

Generally, using the equator of the spherical display device as a center, the size of the display panel is reduced with the increased latitude, and it is required to perform pixel take-out and adjust the pixel pitch to avoid from deformation of the display image. However, when the viewing distance is reduced such that the pixel pitch is less than 2 mm, the human eyes will be more sensitive to the pixel arrangement in the display device, and the conventional pixel take-out method may cause the user to see defects, gaps or crowding in viewing the images.

SUMMARY

One aspect of the present disclosure provides a display panel adapted to a spherical display device. In one embodiment, the display panel includes a substrate and a plurality of display configuration groups. The display configuration groups are arranged on the substrate along a first direction. Each of the display configuration groups corresponds to a display number and a display pitch. Each of the display configuration groups comprises at least one display row arranged along the first direction. Each of the at least one display row of each of the display configuration groups is arranged along a second direction orthogonal to the first direction according to the corresponding display number and the corresponding display pitch. At least two of the display configuration groups include different quantities of the at least one display row from each other.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The present disclosure will now be described more fully hereinafter with reference to the accompanying drawings, in which exemplary embodiments of the invention are shown.

Figure 1:
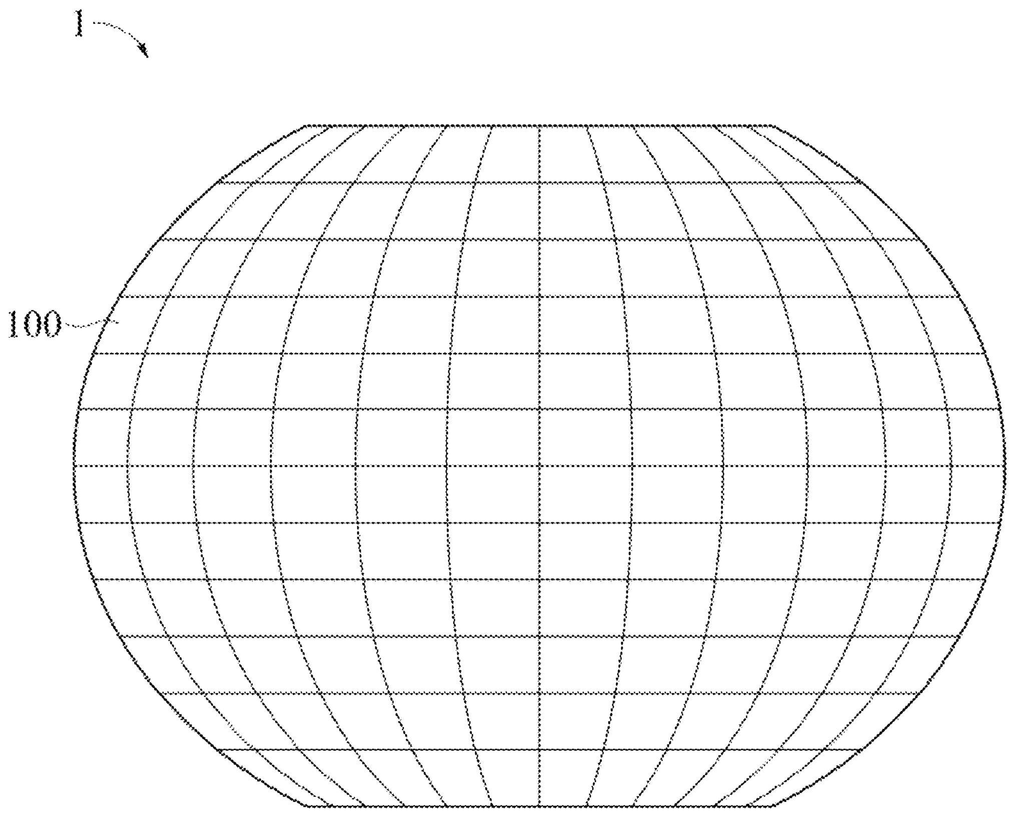
FIG. 1 is a schematic view of a spherical display device according to one embodiment of the present disclosure.
Figure 2:
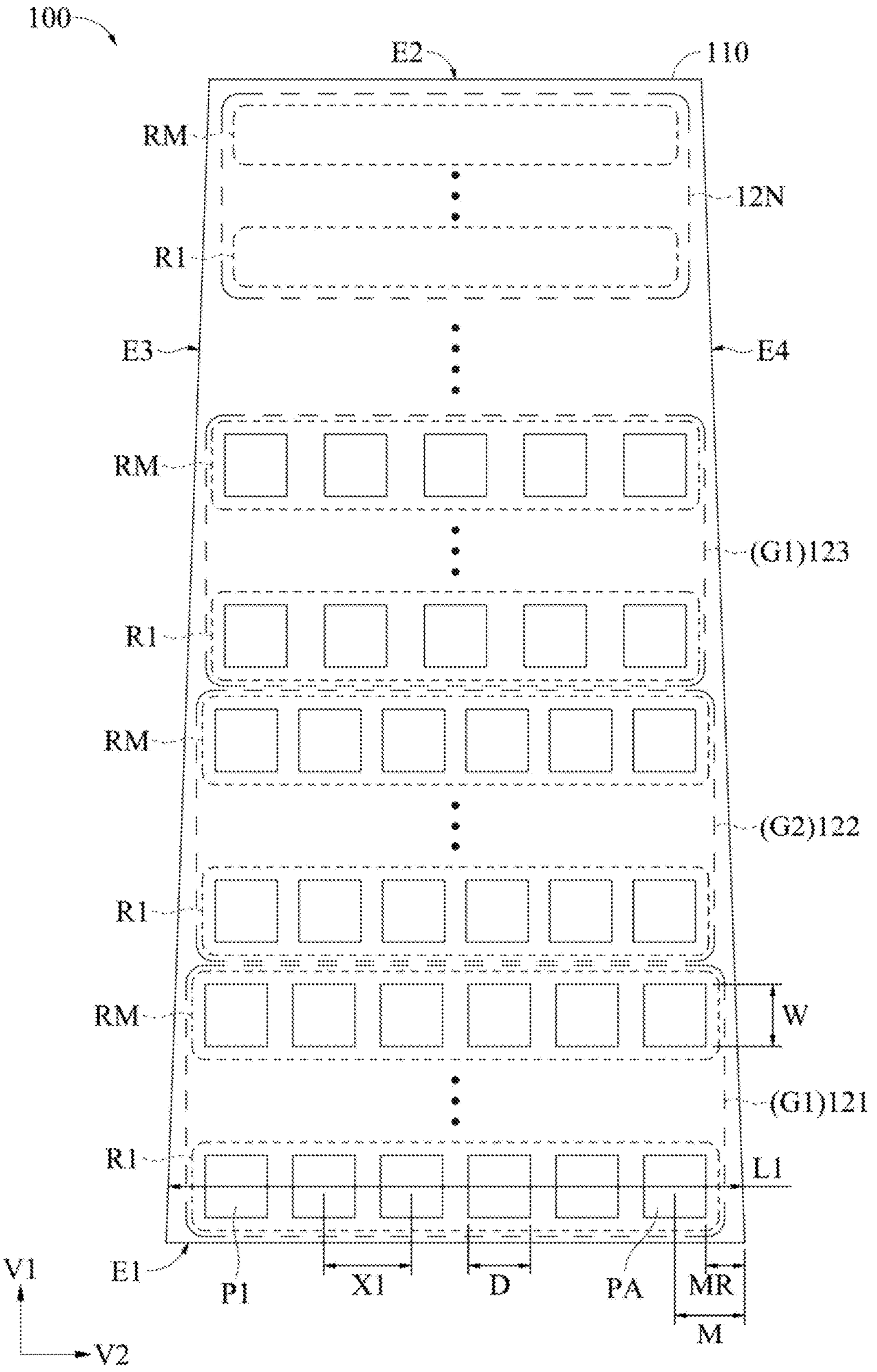
FIG. 2 is a schematic view of a display panel according to one embodiment of the present disclosure.

FIG. 1 is a schematic view of a spherical display device according to one embodiment of the present disclosure. Referring to FIG. 1, the spherical display device 1 may be formed by splicing a plurality of display panels 100. FIG. 2 is a schematic view of a display panel according to one embodiment of the present disclosure. Referring to FIG. 1 and FIG. 2, in one embodiment, each display panel 100 includes a substrate 110 and a plurality of display configuration groups 121-12N.

The substrate 110 has four edges (hereinafter referred to as a first edge E1, a second edge E2, a third edge E3 and a fourth edge E4). The first edge E1 and the second edge E2 are opposite to and parallel to each other. The third edge E3 is connected to one end of the first edge E1 and one end of the second edge E2, the fourth edge E4 is connected to the other end of the first edge E1 and the other end of the second edge E2, and the third edge E3 is opposite to the fourth edge E4. In this case, the second edge E2 is shorter than the first edge E1.

A direction from the first edge E1 toward the second edge E2 is a first direction V1, and the extending direction of the first edge E1 and the second edge E2 is a second direction V2. In this case, the first edge E1 and the second edge E2 are respectively orthogonal to the first direction V1. In other words, the second direction V2 is orthogonal to the first direction V1. In certain embodiments, the substrate 110 has a substrate width L1 (that is, a distance between the third edge E3 and the fourth edge E4) in the second direction V2, and the substrate width L1 is gradually reduced along the first direction V1. In other words, the substrate width L1 closer to the first edge E1 is greater (without being greater than the length of the first edge E1), and the substrate width L1 closer to the second edge E2 is less (without being less than the length of the second edge E2).

In certain embodiments, the sizes of the substrates 110 of the display panels 100 of the spherical display device 1 are not completely identical. For example, using the equator of the spherical display device as a center, with the increased latitude, the size of the substrate 110 of the display panel 100 is reduced. Further, the size of the substrate 110 of the display panel 100 located at the same latitude will be substantially identical.

The display configuration groups 121-12N are arranged on the substrate 110 sequentially along the first direction V1. For example, the display configuration group 121 may be disposed on the substrate 110 adjacent to the first edge E1 of the substrate 110. The rest of the display configuration groups can be done in the same manner, and the display configuration group 12N may be disposed on the substrate 110 adjacent to the second edge E2 of the substrate 110. In other words, the display configuration groups 121-12N are sandwiched between the first edge E1 and the second edge E2 of the substrate 110.

Each of the display configuration groups 121-12N corresponds to a display number and a display pitch X1. The corresponding display number and the corresponding display pitch of each of the display configuration groups 121-12N may be determined according to a take-out rule and a configuration rule, and details of the take-out rule and the configuration rule will be described later.

Each of the display configuration groups 121-12N includes at least one display row R1-RM arranged along the first direction (side-by-side). The display number of each of the display configuration groups 121-12N indicates the quantity of the display units P1-PA included by each display row R1-RM, and the display pitch of each of the display configuration groups 121-12N indicates the pitch between two adjacent display units in each display row R1-RM. In certain embodiments, the pitch between the two adjacent display units may be an absolute distance between a center of one display unit and a center of the other display unit. Further, the quantity of the display rows R1-RM included by the display configuration groups 121-12N may be partially identical or different. For example, each of the display configuration groups 121, 122 may include seven display rows R1-RM (that is, M is 7), the display configuration group 123 includes six display rows R1-RM (that is, M is 6), and the display configuration group 12N includes one display row R1. However, the present disclosure is not limited thereto. For example, in certain embodiments, it is possible that each of the display configuration groups 121-12N includes exactly one display row R1. In this case, a total quantity of the display rows is N, which is equal to a total quantity of the display configuration groups 121-12N.

Each display row R1-RM of each of the display configuration groups 121-12N is disposed with the display number of display units P1-PA along the second direction V2 on the substrate 110 according to the corresponding display number and the corresponding display pitch X1 (that is, the extending direction of each display row R1-RM) is the second direction V2). In each display row R1-RM, the pitch between the two adjacent display units is the corresponding display pitch X1 of the display configuration group 121-12N to which the display row belongs. In this case, in each of the display configuration groups 121-12N, the display row R1 is the display row located closest to the first edge E1, and the display row RM is the display row located closest to the second edge E2.

After disposing the display configuration groups 121-12N on the substrate 110, the display configuration groups 121-12N include two display configuration groups adjacent to each other (referred to as a first configuration group G1 and a second configuration group G2). The display pitch X1 of the first configuration group G1 is different from the display pitch X1 of the second configuration group G2. In this case, the first configuration group G1 and the second configuration group G2 may be any two display configuration groups arranged adjacent to each other on the substrate 110. In other words, the display pitches X1 of any two display configuration groups arranged adjacent to each other on the substrate 110 are different. For example, the distance pitches X1 of the display configuration group 121 and the display configuration group 122 are different; the distance pitches X1 of the display configuration group 122 and the display configuration group 123 are different; and in the same manner, the distance pitches X1 of the display configuration group 12(N−1) and the display configuration group 12N are different.

In certain embodiments, the display configuration groups 121-12N are disposed on the substrate 110 according to the corresponding display numbers sequentially in a descending order along the first direction V1. In other words, the corresponding display number of the display configuration group closer to the first edge E1 of the substrate 110 is greater, and the corresponding display number of the display configuration group closer to the second edge E2 of the substrate 110 is less.

In certain embodiments, the display configuration groups corresponding to the identical display number are disposed on the substrate 110 according to the corresponding display pitches X1 sequentially in a descending order along the first direction V1. In other words, under the condition that the display number is identical, the corresponding display pitch X1 of the display configuration group closer to the first edge E1 of the substrate 110 is larger, and the corresponding display pitch X1 of the display configuration group closer to the second edge E2 of the substrate 110 is smaller.

In certain embodiments, in the second direction V2, an edge distance exists between each display row R1-RM and each of the third edge E3 and the fourth edge E4 of the substrate 110 respectively. The edge distance M is an absolute distance from a center of the display unit P1 of the display units P1-PA of a display row most adjacent to the third edge E3 of the substrate 110 to the third edge E3 of the substrate 110 (or an absolute distance from a center of the display unit PA most adjacent to the fourth edge E4 of the substrate 110 to the fourth edge E4 of the substrate 110). In this case, the edge distance M of the display rows R1-RM of each of the display configuration groups 121-12N is gradually reduced along the first direction V1. In other words, in each of the display configuration groups 121-12N, the edge distance M of the display row R1 is the largest, and the edge distance M of the display row RM is the smallest.

In certain embodiments, the edge distances M of the display rows R1-RM of each of the display configuration groups 121-12N fall within a specific range. The specific range satisfies the following formula 1:

$$\left(\frac{x*(1-y\%)}{2}*\csc\theta+d\right)*\tan\theta \le M \le \left(\frac{x*(1+y\%)}{2}*\csc\theta+d\right)*\tan\theta \quad \text{(formula 1)}$$

where M is the edge distance. x is an ideal pitch between two display units in the second direction V2. y is an acceptable pitch variation. θ is a mounting angle of the display panel 100 when being assembled in the spherical display device 1. d is a unit thickness of each of the display units P1-PA in the Z-axis. In this case, after each of the display units P1-PA is disposed on the substrate 110, the Z-axis is orthogonal to the first direction V1 and the second direction V2.

For example, when the ideal pitch is 1.25 mm, the pitch variation is 10%, the mounting angle is 5 degrees, and the unit thickness is 0.65 mm, the specific range may be obtained from the formula 1 to be substantially between 0.622 mm to 0.747 mm. In other words, a maximum value of the edge distance of each display row R1-RM may be 0.747 mm, and a minimum value of the edge distance of each display row R1-RM may be 0.622 mm.

In certain embodiments, each display unit P1-PA has a unit length D in the X-axis. After each display unit P1-PA is disposed on the substrate, the X-axis is parallel to the second direction V2. When the display panels 100 are spliced to the spherical display device 1, to avoid the two adjacent display panels 100 at the same latitude from display unit collision and/or interference at the adjacent edges (for example, the third edge E3 of one substrate 110 and the fourth edge E4 of the other substrate 110), the unit length D of each display unit P1-PA may satisfy the following formula 2:

$$D < \frac{x(1-y\%)-T}{\cos\theta} \quad \text{(formula 2)}$$

where D is the unit length of each display unit P1-PA. x is an ideal pitch between two display units in the second direction V2. y is an acceptable pitch variation. θ is a mounting angle of the display panel 100 when being assembled in the spherical display device 1. T is a manufacturing process tolerance when manufacturing the display units.

For example, when the ideal pitch is 1.25 mm, the pitch variation is 10%, the mounting angle is 5 degrees, and the manufacturing process tolerance is 0.3, the unit length D of each display unit P1-PA may be obtained from the formula 2 to be substantially less than 0.83 mm. Thus, in the display panel 100 according to any embodiment of the present disclosure, the unit length D of all display units P1-PA disposed on the substrate 110 may be, for example without being limited thereto, 0.8 mm.

Similarly, each display unit P1-PA has a unit width W in the Y-axis. After each display unit P1-PA is disposed on the substrate, the Y-axis is parallel to the first direction V1.

When the display panels 100 are spliced to the spherical display device 1, to avoid the two adjacent display panels 100 at the same longitude from display unit collision and/or interference at the adjacent edges (for example, the first edge E1 of one substrate 110 and the second edge E2 of the other substrate 110), the unit width W of each display unit P1-PA may satisfy the following formula 3:

$$W < \frac{A(1-B\ \%)-T}{\cos\theta} \quad \text{(formula 3)}$$

where W is the unit width of each display unit P1-PA. A is an ideal pitch between two display units in the first direction V1. B is an acceptable pitch variation. θ is a mounting angle of the display panel 100 when being assembled in the spherical display device 1. T is a manufacturing process tolerance when manufacturing the display units.

For example, when the ideal pitch is 1.25 mm, the pitch variation is 10%, the mounting angle is 5 degrees, and the manufacturing process tolerance is 0.3, the unit width W of each display unit P1-PA may be obtained from the formula 3 to be substantially less than 0.83 mm. Thus, in the display panel 100 according to any embodiment of the present disclosure, the unit width W of all display units P1-PA disposed on the substrate 110 may be, for example without being limited thereto, 0.8 mm.

In certain embodiments, the ideal pitch may be obtained by calculation according to human eye visual capability. The calculation is well-known by those skilled in the art, and is thus not hereinafter elaborated. However, the present disclosure is not limited thereto, and in certain other embodiments, the ideal pitch may be further adjusted based on the client need and the specification required by the product.

In certain embodiments, each display panel 100 of the present disclosure may be disposed with each display row R1-RM of each display configuration group 121-12N on the substrate 110 by a panel manufacturing machine (not shown) according to the configuration method of any embodiment. In certain embodiments, the configuration method of any embodiment of the present disclosure may be a program stored in a memory, such that the panel manufacturing machine may read and execute the program (for example, by a processor) to perform the configuration of the display panel 100 according to the configuration method of one embodiment. The memory may be disposed in the panel manufacturing machine, or may be disposed outside the panel manufacturing machine and connected to the panel manufacturing machine through wire or wireless connections.

After the display panels 100 being manufactured by the configuration method of any embodiment of the present disclosure are assembled to the spherical display device 1, the overall display effect of the spherical display device 1 may be optimized. For example, the user may be prevented from seeing defects, gaps or crowding of the display units P1-PA in viewing the images that affects the viewing experience of the user.

Figure 3:
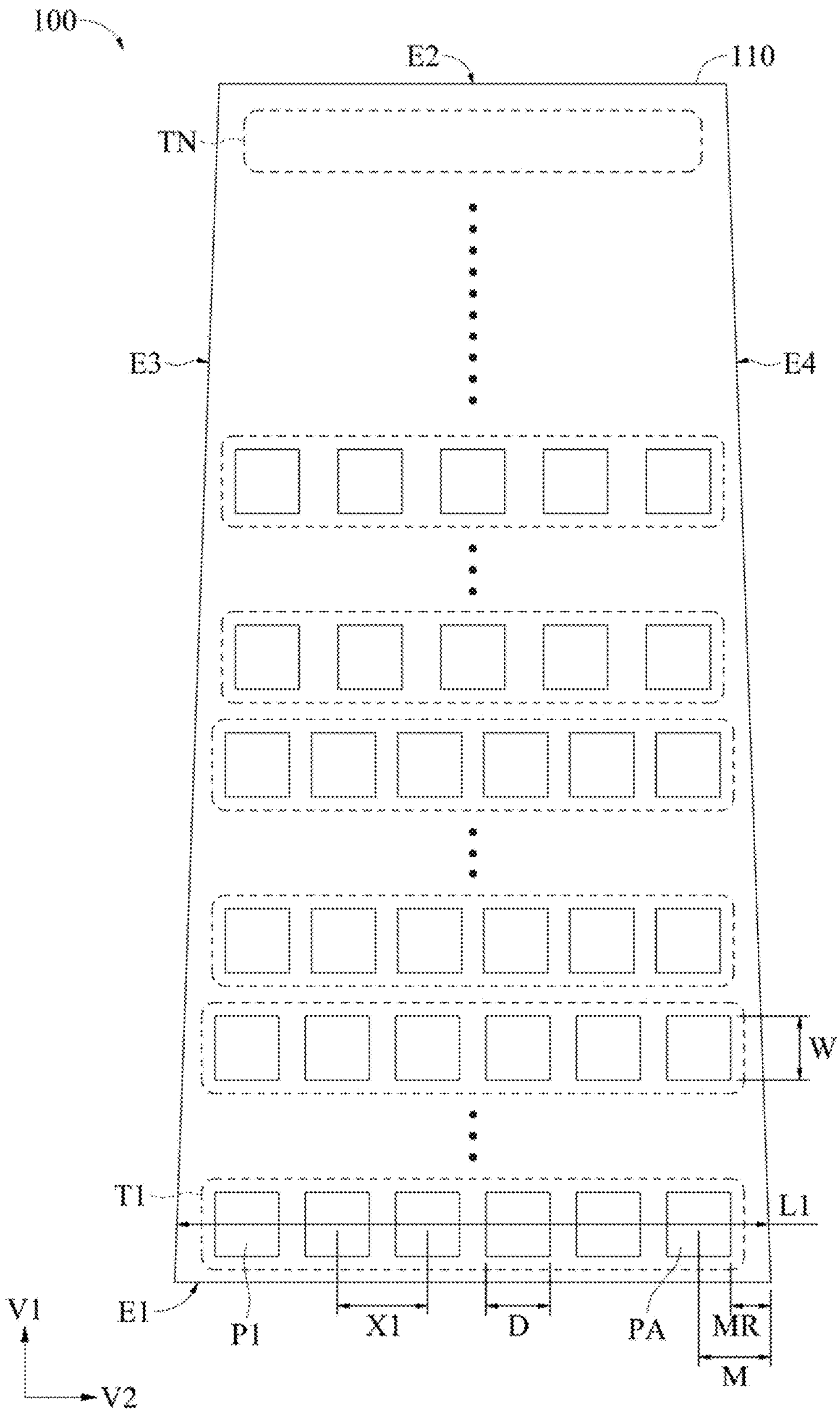
FIG. 3 is a schematic view of a display panel according to one embodiment of the present disclosure.
Figure 4:
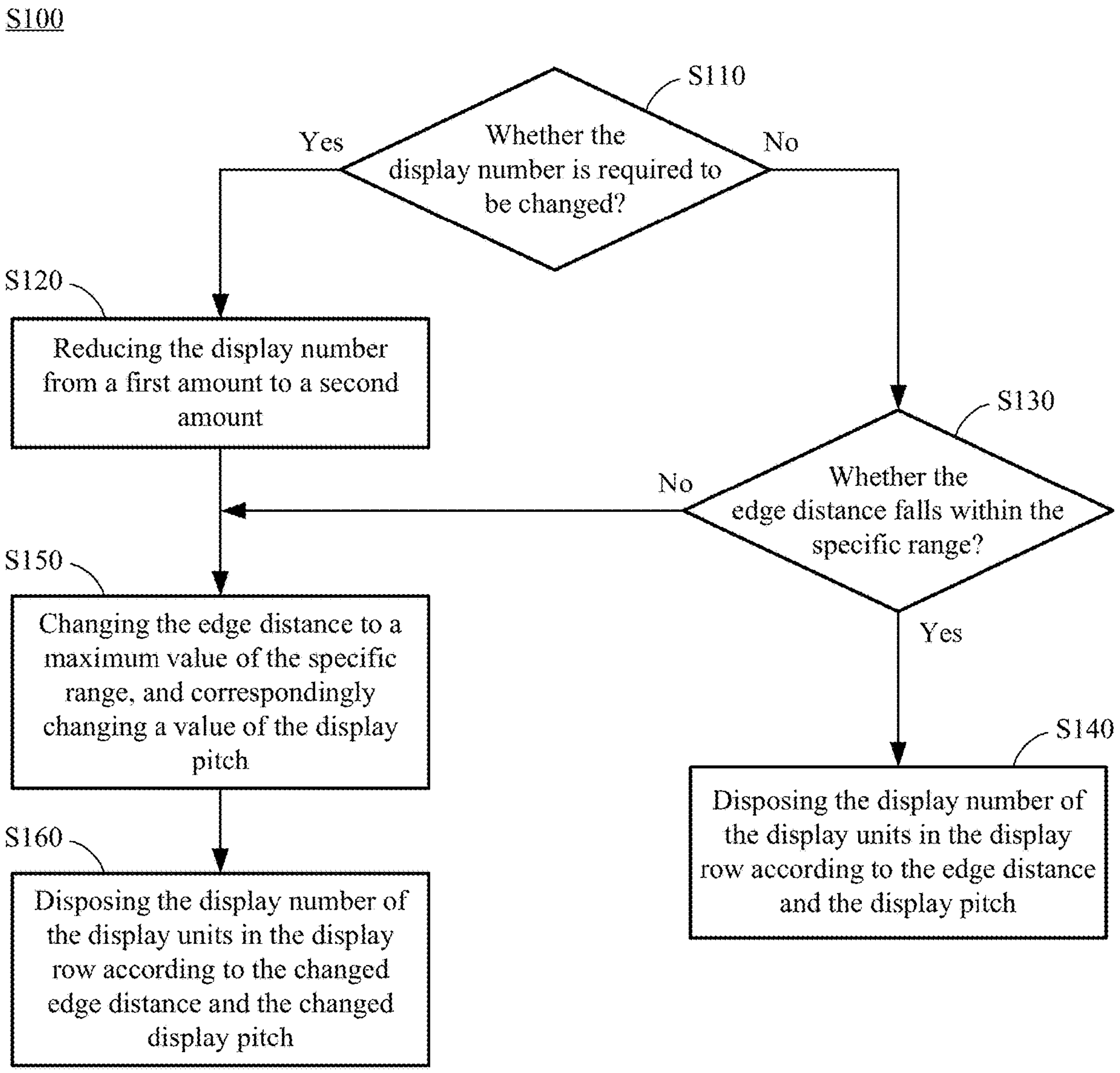
FIG. 4 is a flowchart of a configuration method according to one embodiment of the present disclosure.

FIG. 3 is a schematic view of a display panel according to one embodiment of the present disclosure, and FIG. 4 is a flowchart of a configuration method according to one embodiment of the present disclosure. Referring to FIG. 3 and FIG. 4, in the configuration method according to one embodiment, when each display panel 100 is manufactured, the panel manufacturing machine may dispose, row-by-row (with the display rows T1-TN) according to a configuration rule, the display number of the display units P1-PA on the substrate 110 from the first edge E1 along a first direction V1 (step S100), thus optimizing the overall pixel arrangement of the display panel 100, and avoiding the display image from causing image defects due to the display pitch X1 being too large. In certain embodiments, the unit length D of each display unit P1-PA may satisfy the formula 2. Further, in certain embodiments, the unit width W of each display unit P1-PA may satisfy the formula 3.

In the configuration rule according to one embodiment, firstly, it is determined, according to a take-out rule, whether the display number is required to be changed (step S110). In certain embodiments, the display number of the previous display row prior to the current display row may serve as the display number of the current display row. For example, supposed that the current configuration row is the display row T5, the display number of the previously configured display row T4 prior to the display row T5 is used to serve as the current display number of the display row T5. For the display row T1 that is being firstly configured, the current display number of the display row T1 is obtained by calculating the corresponding substrate width L1 of the display row T1 on the substrate 110 divided by an ideal pitch. For example, supposed that the corresponding substrate width L1 of the display row T1 on the substrate 110 is 7.744 mm, and the ideal pitch is 1.25 mm, 7.744 divided by 1.25 would be 6.1952. In this case, the number is unconditionally carried to obtain the current display number of the display row T1 as 7, and then determination is made as to whether the current display number is required to be changed.

Figure 5:
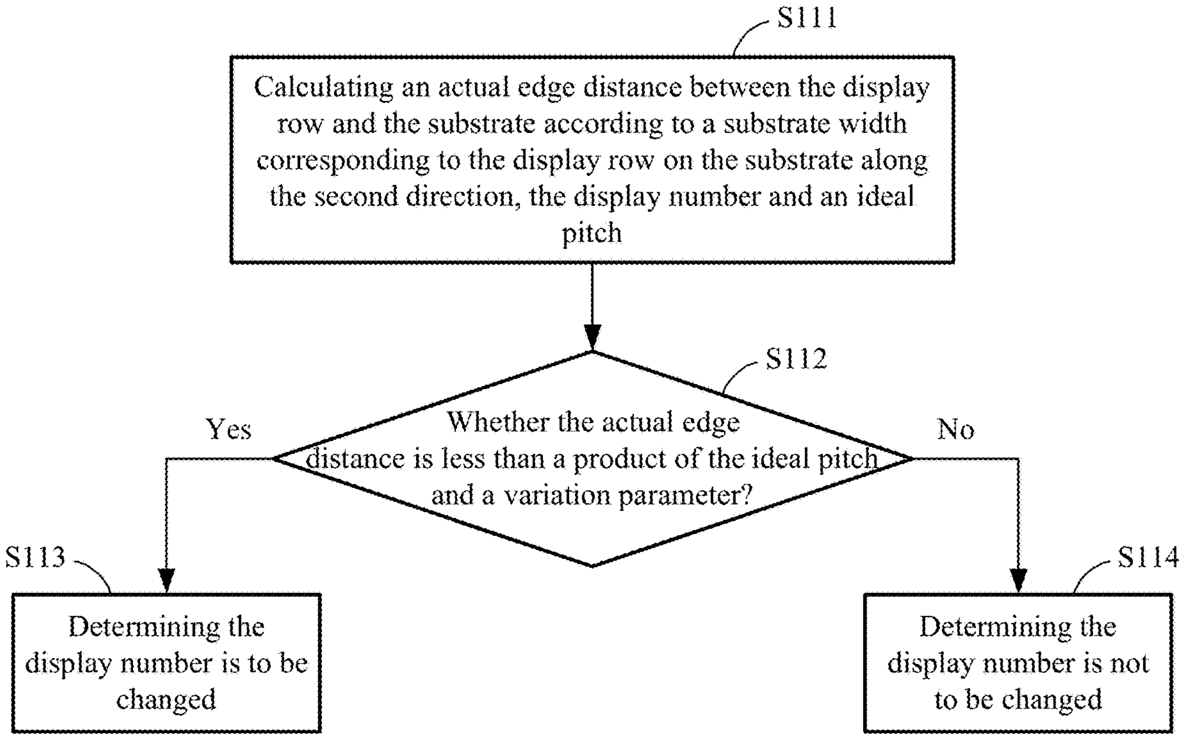
FIG. 5 is a flowchart of the step S110 according to one embodiment of the present disclosure.

FIG. 5 is a flowchart of the step S110 according to one embodiment of the present disclosure. Referring to FIG. 3 and FIG. 5, in the take-out rule according to one embodiment, an actual edge distance MR between the display row and the substrate 110 in the second direction V2 is firstly calculated according to the substrate width L1 corresponding to the display row on the substrate, the current display number and the ideal pitch between the two display units in the second direction V2 (step S111). The actual edge distance MR is an absolute distance between the display unit P1 closest to the third edge E3 of the substrate 110 to the third edge E3 of the substrate 110 (or an absolute distance between the display unit PA closest to the fourth edge E4 of the substrate 110 to the fourth edge E4 of the substrate 110) when the display units P1-PA of the display row are arranged in the ideal pitch.

Then, it is confirmed as to whether the actual edge distance MR is less than a product of the ideal pitch and a variation parameter (step S112). The relationship between the actual edge distance MR and the product of the ideal pitch and the variation parameter may be represented by the following formula 4:

$$\frac{L1-(C-1)*x-D}{2} < H*x \qquad \text{(formula 4)}$$

where L1 is the corresponding substrate width of the display row on the substrate 110, C is the display number, x is an ideal pitch, D is the unit length of each display unit P1-PA, and H is the variation parameter.

In certain embodiments, the variation parameter may be 0.1, but the present disclosure is not limited thereto. The variation parameter may be a result value according to the comprehensive evaluation of the pitch variation between the two display units, which may change based on the different products.

When it is confirmed that the actual edge distance MR is less than the product, it is determined that the display number is to be changed (step S113). On the other hand, when it is confirmed that the actual edge distance MR is greater than or equal to the product, it is determined that the display number is not to be changed (step S114).

Referring to FIG. 3 and FIG. 4, in the configuration rule according to certain embodiments, in response to determining that the display number is required to be changed, the display number is reduced from a first amount to a second amount (step S120). In certain embodiments, the second amount is the first amount minus 1.

For example, using the aforementioned conditions of the display row T1 in the formula 4, where the substrate width L1 is 7.744 mm, the current display number is 7, the ideal pitch is 1.25 mm, the unit length D is 0.8 mm, and the variation parameter is 0.1, the actual edge distance MR being calculated would be less than 0.125 mm, which is less than the product of the ideal pitch and the variation parameter. Thus, the current display number of the display row T1 is reduced from 7 to become 6 (where the second amount is 6).

In the configuration rule according to certain embodiments, after the display number is reduced to the second amount (that is, the step S120 is performed), the edge distance M is changed to a maximum value of the specific range, and a value of the display pitch X1 is correspondingly changed (step S150). Then, the panel manufacturing machine is operated to dispose the display number of the display units P1-PA in the display row according to the changed edge distance M1 and the changed display pitch X1 (step S160).

In certain embodiments of the step S150, the maximum value of the specific range may be obtained according to the formula 1, for example, 0.747 mm is obtained, and the edge distance M is set to be 0.747 mm. Then, the corresponding display pitch X1 may be calculated according to the substrate width L1, the maximum value of the specific range and the current display number. For example, using the aforementioned conditions of the display row T1, the corresponding display pitch X1 may be calculated to be 1.25 mm $$\left(\frac{\text{substrate width} - 2*\text{edge distance}}{\text{display number} - 1}\right).$$

Thus, after changing the edge distance M to become 0.747 mm, the display pitch X1 is correspondingly changed to become 1.25 mm. Then, in the step S160, the panel manufacturing machine may dispose 6 display units P1-PA in the display row T1 with the edge distance M of 0.747 mm and the display pitch X1 of 1.25 mm.

In the configuration rule according to certain embodiments, when it is determined that the display number is not required to be changed, it is confirmed, when the display number of the display units P1-PA are disposed in a display row according to the current display pitch X1, whether the edge distance M between the display row and the substrate 110 falls within the specific range (step S130). In certain embodiments, the specific range may be obtained in the formula 1.

In the configuration rule according to certain embodiments, when it is confirmed that the edge distance M falls within the specific range, the panel manufacturing machine is operated to dispose the display number of the display units P1-PA in the display row according to the current edge distance M and the display pitch X1 (step S140).

Figure 6:
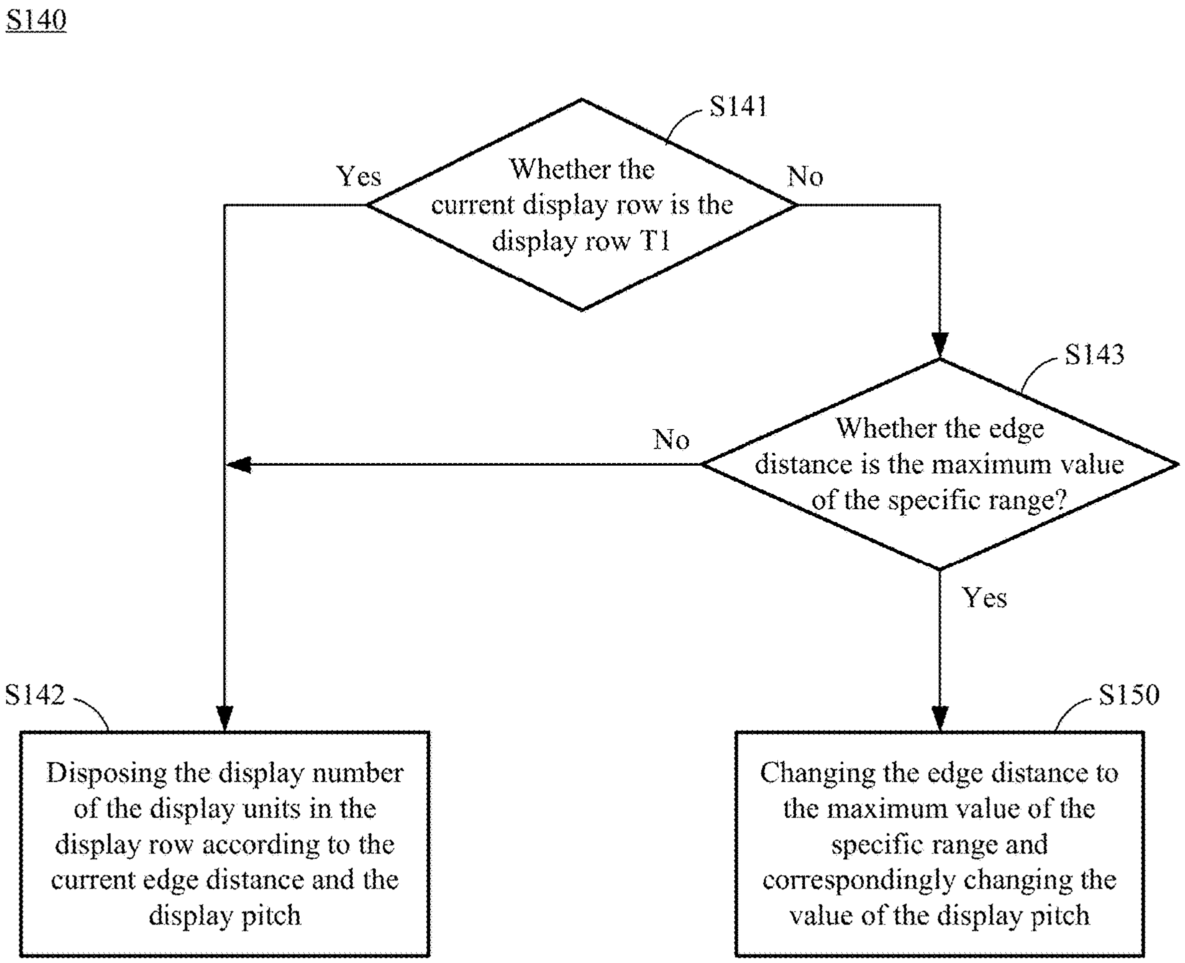
FIG. 6 is a flowchart of the step S140 according to one embodiment of the present disclosure.

FIG. 6 is a flowchart of the step S140 according to one embodiment of the present disclosure. In certain embodiments of the step S140, when it is confirmed that the edge distance M falls within the specific range, it is further confirmed as to whether the current display row is the display row T1 (that is, the first row) (step S141). When it is confirmed that the current display row is not the display row T1, the panel manufacturing machine is operated to dispose the display number of the display units P1-PA in the display row according to the current edge distance M and the display pitch X1 (step S142). On the other hand, when it is confirmed that the current display row is the display row T1, it is further confirmed as to whether the current edge distance M is the maximum value of the specific range (step S143). When the current edge distance M is the maximum value of the specific range, the step S142 is performed to dispose the display number of the display units P1-PA in the display row according to the current edge distance M and the display pitch X1. When the current edge distance M is not the maximum value of the specific range, for example, when the current edge distance M is 0.7 mm, the step S150 and the step S160 are performed, in order to change the edge distance M to the maximum value of the specific range (such as 0.747 mm) and to correspondingly change the value of the display pitch X1, and then to dispose the display number of the display units in the display row T1 according to the changed edge distance M and the changed display pitch X1.

In the configuration rule according to certain embodiments, when it is confirmed that the edge distance M does not fall within the specific range in the step S140, the step S150 and the step S160 are performed. In other words, the edge distance M is changed to the maximum value of the specific range and the value of the display pitch X1 is correspondingly changed, and then the panel manufacturing machine is operated to dispose the display number of the display units in the display row T1 according to the changed edge distance M and the changed display pitch X1.

For example, supposed that the corresponding substrate width L1 of the display row T5 on the substrate 110 is 7.4 mm, the current display number is 6, the current display pitch X1 is 1.25 mm, the specific range of the edge distance M is substantially between 0.622 mm and 0.747 mm, the unit length D of each display unit P1-PA is 0.8 mm, and the variation parameter is 0.1. Firstly, it is confirmed that the actual edge distance MR is greater than the product of the ideal pitch and the variation parameter according to the formula 4, and it is determined that the display number is not to be changed. Then, the current edge distance M may be calculated as 0.575 mm according to the substrate width L1, the display number and the display pitch X1. Since the edge distance M does not fall within the specific range, the edge distance is changed to the maximum value of the specific range (that is, 0.747 mm), and the value of the display pitch X1 is correspondingly changed to become 1.1812 mm. Subsequently, the panel manufacturing machine may dispose 6 display units P1-PA in the display row T5 on the substrate 110 with the edge distance M of 0.747 mm and the display pitch X1 of 1.1812 mm.

In certain embodiments, after configuring the current display row (that is, the step S160 is performed), if there is a subsequent display row to be configured, the process returns to the step S110 and restart the determinations according to the corresponding conditions (such as the substrate width L1, the display number, the display pitch X1, etc.) of the subsequent display row.

To sum up, once the display number and the display pitch X1 of the first display row T1 are determined, the display units may be disposed row-by-row according to the display pitch X1 and the display number, until the edge distance M of one display row falls out of the specific range (for example, being less than the minimum value of the specific range) or the take-out process is required (that is, the display number is reduced). In this case, the edge distance M of this display row is adjusted to become the maximum value of the specific range, and the display pitch X1 is correspondingly adjusted, and then the display units can be disposed according to the adjusted display pitch X1.

Figure 7:
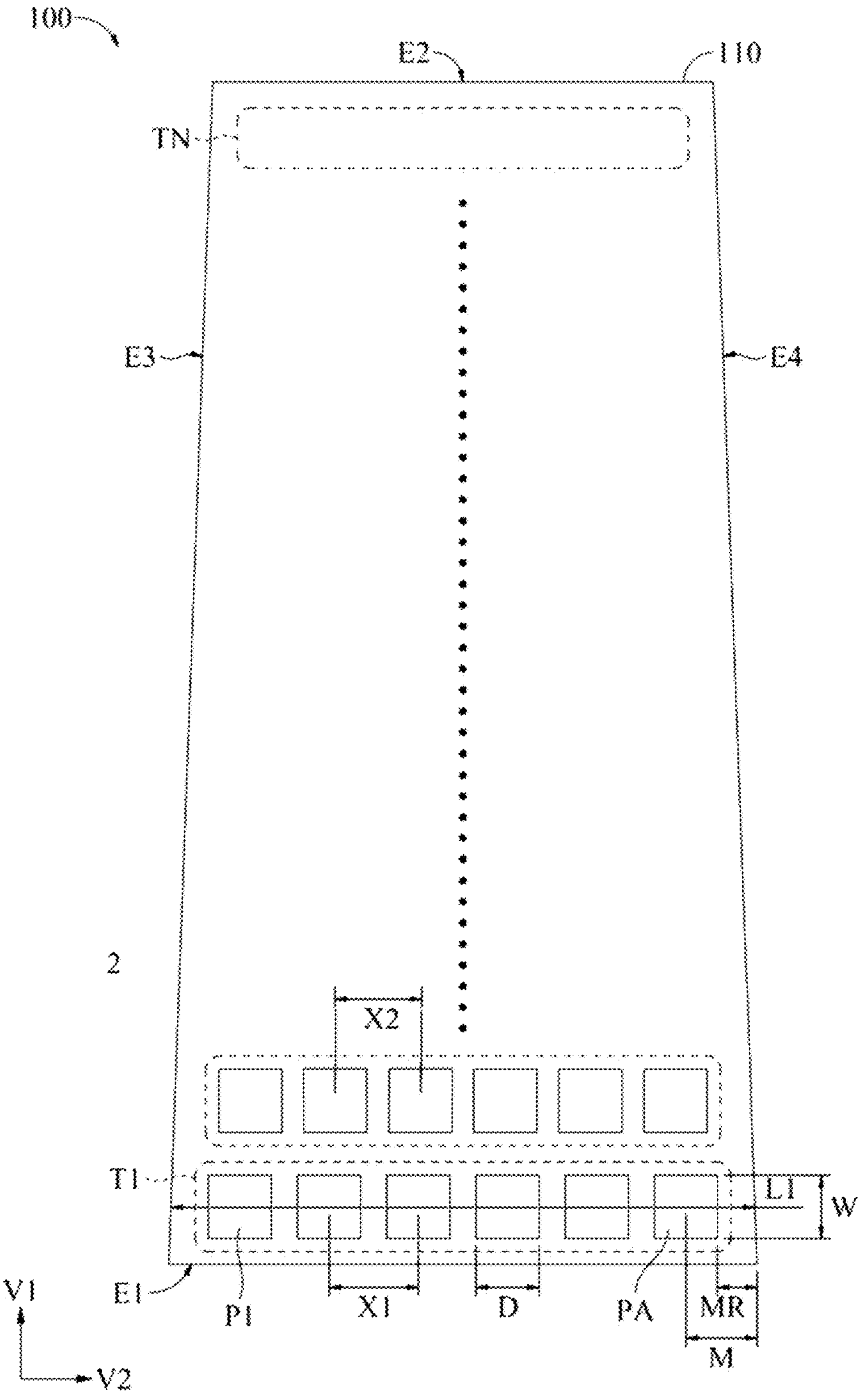
FIG. 7 is a schematic view of a display panel according to one embodiment of the present disclosure.
Figure 8:
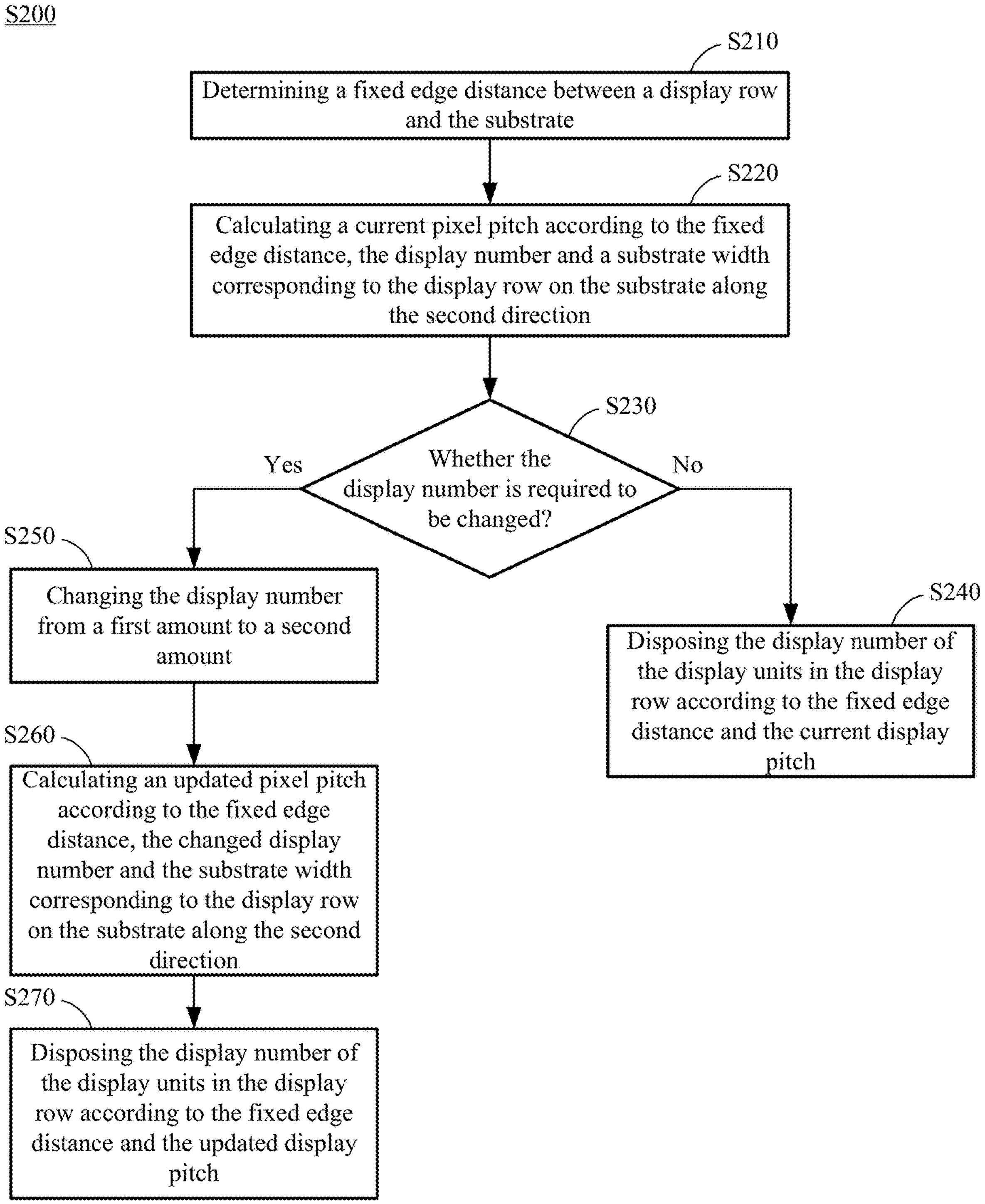
FIG. 8 is a flowchart of a configuration method according to one embodiment of the present disclosure.

FIG. 7 is a schematic view of a display panel according to one embodiment of the present disclosure, and FIG. 8 is a flowchart of a configuration method according to one embodiment of the present disclosure. Referring to FIG. 7 and FIG. 8, in the configuration method according to one embodiment, when each display panel 100 is manufactured, the panel manufacturing machine may dispose, row-by-row (with the display rows T1-TN) according to a configuration rule, the display number of the display units P1-PA on the substrate 110 from the first edge E1 along a first direction V1 (step S100), thus optimizing the overall pixel arrangement of the display panel 100, and avoiding the display image from causing image defects due to the display pitch X1 being too large. In certain embodiments, the unit length D of each display unit P1-PA may satisfy the formula 2. Further, in certain embodiments, the unit width W of each display unit P1-PA may satisfy the formula 3.

The main difference between the configuration method as shown in FIG. 7 and FIG. 8 from the configuration method as shown in FIG. 3 and FIG. 4 exists in that, in the configuration method as shown in FIG. 7 and FIG. 8, a fixed edge distance MR is used for all of the display rows on the same display panel. Referring to FIG. 7 and FIG. 8, in the configuration rule according to one embodiment, firstly, a fixed edge distance MR between a display row and the substrate is determined (step S210). The fixed edge distance MR is an absolute distance between the display unit P1 closest to the third edge E3 of the substrate 110 to the third edge E3 of the substrate 110 (or an absolute distance between the display unit PA closest to the fourth edge E4 of the substrate 110 to the fourth edge E4 of the substrate 110). Then, for each display row, a current display pitch may be calculated according to the fixed edge distance, the display number and a substrate width L1 corresponding to the display row on the substrate 110 along the second direction V2 (step S220). Specifically, the current display pitch X may be obtained according to the following formula 5:

$$X = \frac{L1 - D - 2 * MR}{C - 1} \quad \text{(formula 5)}$$

where X is the current display pitch, L1 is the corresponding substrate width of the display row on the substrate 110, D is the unit length of each display unit P1-PA, MR is the fixed edge distance, and C is the display number.

It should be noted that, since the fixed edge distance MR is used for all display rows on the same display panel, the display pitch of each display row will be different. For example, as shown in FIG. 7, the current display pitch X1 of the first display row T1 is different from the current display pitch X2 of the second display row T2.

Once the current display pitch of the display row is obtained, it is determined, according to a take-out rule using the current display pitch, whether the display number is required to be changed (step S230). In certain embodiments, the display number of the previous display row prior to the current display row may serve as the display number of the current display row.

Figure 9:
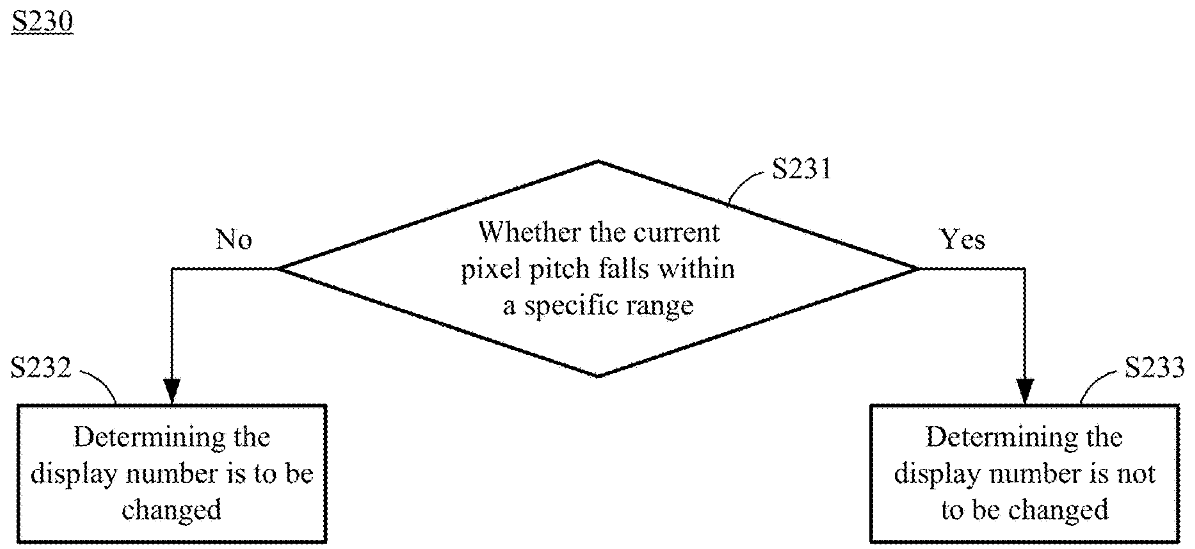
FIG. 9 is a flowchart of the step S230 according to one embodiment of the present disclosure.

FIG. 9 is a flowchart of the step S230 according to one embodiment of the present disclosure. Referring to FIG. 7 and FIG. 9, in the take-out rule according to one embodiment, it is determined as to whether the current display pitch falls within a specific range (step S231). Specifically, the specific range has a minimum value, and when the current display pitch is less than the minimum value of the specific range, it is determined that the current display pitch does not fall within the specific range. When it is determined that the current display pitch does not fall within the specific range (that is, the current display pitch is less than the minimum value of the specific range), it is determined that the display number is to be changed (step S232). On the other hand, when it is determined that the current display pitch falls within the specific range (that is the current display pitch is greater than or equal to than the minimum value of the specific range), it is determined that the display number is not to be changed (step S233).

Referring to FIG. 7 and FIG. 8, in the configuration rule according to certain embodiments, in response to determining that the display number is not required to be changed, the panel manufacturing machine is operated to dispose the display number of the display units P1-PA in the display row according to the fixed edge distance MR and the current display pitch (step S240).

On the other hand, in response to determining that the display number is required to be changed, the display number is changed from a first amount to a second amount (step S250). In certain embodiments, the second amount is the first amount minus 1. In other words, the display number is reduced from the first amount to the second amount. Then, an updated display pitch is calculated according to the fixed edge distance MR, the changed display number (that is, the second amount) and the substrate width L1 corresponding to the display row on the substrate along the second direction (step S260). Subsequently, the panel manufacturing machine is operated to dispose the display number of the display units P1-PA in the display row according to the fixed edge distance MR and the updated display pitch X1 (step S270).

In certain embodiments, after configuring the current display row (that is, the step S240 or the step S270 is performed), if there is a subsequent display row to be configured, the process returns to the step S220 and restart the determinations according to the corresponding conditions (such as the substrate width L1, the display number, the fixed edge distance MR, etc.) of the subsequent display row.

To sum up, once the display number and the display pitch X1 of the first display row T1 as well as the fixed edge distance of all display rows are determined, the display units may be disposed row-by-row by calculating the current display pitch of each display row according to the fixed edge distance and the display number, until the current display pitch of one display row falls out of the specific range (for example, being less than the minimum value of the specific range). In this case, the take-out process is performed (that is, the display number is changed or reduced), allowing more space for the display pitch of the display row to fall within the specific range, and the display pitch X1 is correspondingly adjusted, and then the display units can be disposed according to the adjusted display pitch X1.

In the embodiments as described above, the panel manufacturing machine may dispose, row-by-row (with the display rows T1-TN) according to a configuration rule, the display number of the display units P1-PA on the substrate 110 along the first direction V1, which is the direction from the first edge E1 toward the second edge E2. However, in certain embodiments, it is also possible that the panel manufacturing machine may dispose, row-by-row (with the display rows T1-TN) according to a configuration rule, the display number of the display units P1-PA on the substrate 110 along a reverse direction of the first direction V1 (that is, the direction from the second edge E2 toward the first edge E1). In this case, when it is determined that the display number is required to be changed, the display number may be increased instead of being reduced.

In certain embodiments, each display unit P1-PA is a pixel unit of the display panel 100, which may be facilitated by, without being limited thereto, lamps of single color (such as the light-emitting diodes (LEDs) of a single color selected from red, green and blue), dual color (such as the LEDs of two different colors selected from red, green and blue) or full color (such as the LEDs of each color selected from red, green and blue).

In certain embodiments, the substrate 110 may be a substrate at least supporting the circuits. The circuits may be, for example, the driving circuit, the control circuit, etc., without being limited thereto. Further, the material of the substrate 110 may be glass, quartz, sapphire or other suitable materials in order to form a hard substrate, but the present disclosure is not limited thereto, and the substrate 110 may also be a flexible substrate.

In sum, in the display panel adapted to the spherical display device according to any embodiment of the present disclosure, among the display configuration groups, the display pitch of the first configuration group is different from the display pitch of the second configuration group. With such pixel arrangement, the image defects caused by the pixel take-out (reducing the display number) may be prevented, such that the overall display effect of the spherical display device may be optimized when the display panels are assembled to the spherical display device. Further, in the display panel adapted to the spherical display device manufactured by the configuration method according to any embodiment of the present disclosure, the edge distance of each display row of each display configuration group is gradually reduced along the first direction, thus enhancing the optimization effect.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display panel adapted to a spherical display device, comprising:

a substrate; and a plurality of display configuration groups, arranged on the substrate along a first direction, wherein each of the display configuration groups corresponds to a display number and a display pitch, each of the display configuration groups comprises at least one display row arranged along the first direction, and each of the at least one display row of each of the display configuration groups is arranged along a second direction orthogonal to the first direction according to the corresponding display number and the corresponding display pitch;

wherein at least two of the display configuration groups include different quantities of the at least one display row from each other.

2. The display panel adapted to the spherical display device according to claim 1, wherein the display configuration groups comprise a first configuration group and a second configuration group adjacent to each other, and the display pitch of the first configuration group is different from the display pitch of the second configuration group.

3. The display panel adapted to the spherical display device according to claim 1, wherein the substrate has a substrate width in the second direction, and the substrate width is gradually reduced along the first direction.

4. The display panel adapted to the spherical display device according to claim 1, wherein the display configuration groups are disposed according to the corresponding display numbers sequentially in a descending order along the first direction.

5. The display panel adapted to the spherical display device according to claim 4, wherein the display configuration groups having the identical display number are disposed according to the corresponding display pitches sequentially in a descending order along the first direction.

6. The display panel adapted to the spherical display device according to claim 1, wherein an edge distance exists between each of the at least one display row and the substrate in the second direction, and the edge distance of each of the at least one display row of each of the display configuration groups is gradually reduced along the first direction.

7. The display panel adapted to the spherical display device according to claim 6, wherein each of the at least one display row of each of the display configuration groups comprises the display number of display units, and the edge distance of each of the display units satisfies the following formula:

$$\left(\frac{x*(1-y\%)}{2}*\csc\theta+d\right)*\tan\theta \le M \le \left(\frac{x*(1+y\%)}{2}*\csc\theta+d\right)*\tan\theta;$$

wherein M is the edge distance, x is an ideal pitch, y is a pitch variation, θ is a mounting angle, and dis a unit thickness of each of the display units.

8. The display panel adapted to the spherical display device according to claim 1, wherein each of the at least one display row of each of the display configuration groups comprises the display number of display units, each of the display units has a unit length, and the unit length satisfies the following formula:

$$D < \frac{x(1-y\%)-T}{\cos\theta};$$

wherein D is the unit length, x is an ideal pitch, y is a pitch variation, θ is a mounting angle, and Tis a manufacturing process tolerance.

9. The display panel adapted to the spherical display device according to claim 1, wherein each of the at least one display row of each of the display configuration groups comprises the display number of display units, each of the display units has a unit width, and the unit width satisfies the following formula:

$$W < \frac{A(1-B\%)-T}{\cos\theta};$$

wherein W is the unit width, A is an ideal pitch, B is a pitch variation, θ is a mounting angle, and Tis a manufacturing process tolerance.

* * * * *